(12) United States Patent
Kameda et al.

(10) Patent No.: US 8,862,934 B2
(45) Date of Patent: Oct. 14, 2014

(54) REDUNDANT COMPUTING SYSTEM AND REDUNDANT COMPUTING METHOD

(75) Inventors: Yoshio Kameda, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 13/510,621

(22) PCT Filed: Nov. 26, 2010

(86) PCT No.: PCT/JP2010/071617
§ 371 (c)(1),
(2), (4) Date: May 17, 2012

(87) PCT Pub. No.: WO2011/068177
PCT Pub. Date: Jun. 9, 2011

(65) Prior Publication Data
US 2012/0233506 A1    Sep. 13, 2012

(30) Foreign Application Priority Data

Dec. 2, 2009  (JP) ................................ 2009-274077

(51) Int. Cl.
| | |
|---|---|
| G06F 11/00 | (2006.01) |
| G06F 11/22 | (2006.01) |
| G06F 11/07 | (2006.01) |
| G06F 11/16 | (2006.01) |

(52) U.S. Cl.
CPC ........ *G06F 11/1658* (2013.01); *G06F 11/1629* (2013.01); *G06F 11/1687* (2013.01); *G06F 11/165* (2013.01); *G06F 11/1641* (2013.01); *G06F 11/2236* (2013.01); *G06F 11/0793* (2013.01)
USPC ............................................ 714/11; 714/37

(58) Field of Classification Search
USPC ................................ 714/11, 37, 745; 700/4, 2
See application file for complete search history.

(56) References Cited

U.S. PATENT DOCUMENTS

| | | | | |
|---|---|---|---|---|
| 4,684,885 A | * | 8/1987 | Chapman et al. ............. | 714/735 |
| 7,024,594 B2 | * | 4/2006 | Pignol ............................. | 714/54 |

(Continued)

FOREIGN PATENT DOCUMENTS

| | | |
|---|---|---|
| JP | 62-280937 A | 2/1987 |
| JP | 63-276131 A | 11/1988 |

(Continued)

OTHER PUBLICATIONS

Japanese Office Action dated May 22, 2013, with partial English translation.

(Continued)

*Primary Examiner* — Yolanda L Wilson
(74) *Attorney, Agent, or Firm* — McGinn IP Law Group, PLLC

(57) ABSTRACT

A redundant computing system is composed of two systems: a first arithmetic processing unit (A-system) and a second arithmetic processing unit (B-system) having the same functions. A diagnosis control unit performs diagnosis of one system while the other system is performing arithmetic processing operation. The diagnosis control unit controls the input to the first and second arithmetic processing units by way of an input control unit according to the diagnosis operation, and an output control unit controls the output from the first and second arithmetic processing units according to the diagnosis result. After termination of the diagnosis, a value is copied from a storage unit of the system which has not been diagnosed to a storage unit of the system which has been diagnosed, and the redundant computing system resumes the redundant operation.

18 Claims, 15 Drawing Sheets

(56) References Cited

U.S. PATENT DOCUMENTS

| | | | |
|---|---|---|---|
| 7,290,169 B2 | 10/2007 | Safford et al. | |
| 7,328,369 B2* | 2/2008 | Manoni | 714/11 |
| 7,516,358 B2* | 4/2009 | Haefliger et al. | 714/10 |
| 7,681,073 B2* | 3/2010 | Anderson et al. | 714/11 |
| 8,296,602 B2* | 10/2012 | Fukuda | 714/10 |
| 8,301,411 B2 | 10/2012 | Okayasu | |
| 8,305,782 B2* | 11/2012 | Bjorklund et al. | 363/51 |
| 8,373,435 B2* | 2/2013 | Bogenberger et al. | 326/21 |
| 2001/0025352 A1* | 9/2001 | Ghameshlu et al. | 714/11 |
| 2004/0073836 A1 | 4/2004 | Shimada | |
| 2005/0240811 A1 | 10/2005 | Safford et al. | |
| 2010/0049268 A1* | 2/2010 | Martins | 607/9 |

FOREIGN PATENT DOCUMENTS

| | | | |
|---|---|---|---|
| JP | 2-138636 A | 5/1990 |
| JP | 2-162430 A | 6/1990 |
| JP | 3-71237 A | 3/1991 |
| JP | H 3-265016 A | 11/1991 |
| JP | 3210527 B2 | 9/2001 |
| JP | 2003-015900 A | 1/2003 |
| JP | 2005-182693 A | 7/2005 |
| JP | 2005-302020 A | 10/2005 |
| JP | 2008-262557 A | 10/2008 |
| WO | WO 2009/011028 A1 | 1/2009 |

OTHER PUBLICATIONS

Japanese Office Action dated Aug. 21, 2013, with English translation.
International Search Report in PCT/JP2010/071617 dated Feb. 22, 2011(English Translation Thereof).

* cited by examiner

REDUNDANT COMPUTING SYSTEM AND REDUNDANT COMPUTING METHOD

TECHNICAL FIELD

This invention relates to a redundant computing system composed of two systems operating in synchronization with each other, and particularly relates to a redundant computing system and redundant computing method capable of diagnosing each of the two systems.

BACKGROUND ART

Computing systems have been introduced for use in financial industries, nuclear power plants and so on to perform mission-critical tasks. Such computing systems are required to ensure high reliability.

As a method of configuring a highly reliable computing system, a redundant computing system has been proposed in which a system having a certain arithmetic processing function and another system having the same function are prepared and these two systems are operated in synchronization.

This redundant computing system, as shown in FIG. 1 for example, is composed of two systems, namely an arithmetic processing unit (A-system) 80A and an arithmetic processing unit (B-system) 80B, and their outputs are input to an comparator 50 and an output control unit 40. The comparator 50 compares the output values from these two systems. If the values do not match, the comparator 50 determines that there is a failure in either the arithmetic processing unit (A-system) 80A or the arithmetic processing unit (B-system) 80B, and informs the output control unit 40 of the comparison result. In this case, the output control unit 40 stops the output. This enables the redundant computing system to avoid outputting an error outside of the system and to improve its reliability.

Further, a redundant computing system as shown in FIGS. 2 and 3 has been proposed, which has a diagnosis unit (A-system) 31A for diagnosing an arithmetic processing unit (A-system) 80A and a diagnosis unit (B-system) 31B for diagnosing an arithmetic processing unit (B-system) 80B (see Patent Document 1, Japanese Patent No. 3210527). This redundant computing system is configured such that when an error is detected, the diagnosis unit (A-system) 31A and the diagnosis unit (B-system) 31 respectively diagnose the arithmetic processing unit (A-system) 80A and the arithmetic processing unit (B-system) 80B to determine which system is in failure causing the error, and the redundant computing system operates in a degenerate mode with only the system not in failure.

SUMMARY

As shown in FIG. 3, in the redundant computing system described in Patent Document 1, arithmetic processing operation is normally performed by both of the A-system and the B-system. If a discrepancy is detected by the comparator 50, the A-system and the B-system stop the arithmetic processing operation, and the diagnosis unit (A-system) 31A and the diagnosis unit (B-system) 31B start diagnosis thereof. This means that this redundant computing system has a problem that the arithmetic processing operation is stopped while the diagnosis is performed.

Further, the diagnosis unit starts diagnosis after occurrence of an error due to a failure in the arithmetic processing unit. Therefore, it is impossible to detect a failure before an error is induced thereby.

This invention has been made in view of the circumstances as described above, and it is an object of the invention to provide a redundant computing system which is configured to perform diagnosis of one system of the redundant computing system while the other system is in operation so that a failure can be detected without the need of stopping the arithmetic processing operation for performing the diagnosis.

It is another object of the invention to provide a redundant computing system capable of detecting a failure before an error is induced thereby.

It is still another object of the invention to provide a redundant computing method which can provide the same effects as those of the redundant computing system.

An aspect of this invention provides a redundant computing system wherein: an input of a first arithmetic processing unit having a first storage unit and an input of a second arithmetic processing unit with the same function as that of the first arithmetic processing unit and having a second storage unit are connected to an input control unit; an output of the first arithmetic processing unit and an output of the second arithmetic processing unit are connected to a comparator and an output control unit; the redundant computing system includes a diagnosis control unit that diagnoses the first arithmetic processing unit and the second arithmetic processing unit; the first arithmetic processing unit and the second arithmetic processing unit perform the same processing in synchronization with each other.

In the redundant computing system according to this aspect of the invention, the diagnosis control unit has a function to control such that, in the course of the synchronous performance of the same processing between the first arithmetic processing unit and the second arithmetic processing unit, the second arithmetic processing unit is diagnosed while the first arithmetic processing unit continues the processing, and after completion of the diagnosis, a value in the first storage unit is copied to the second storage unit, and then the first arithmetic processing unit and the second arithmetic processing unit are caused to resume the synchronous performance of the same processing. The diagnosis control unit has a function to control such that, in the course of the synchronous performance of the same processing between the first arithmetic processing unit and the second arithmetic processing unit, the first arithmetic processing unit is diagnosed while the second arithmetic processing unit continues the processing, and after completion of the diagnosis, a value in the second storage unit is copied to the first storage unit, and then the first arithmetic processing unit and the second arithmetic processing unit are caused to resume the synchronous performance of the same processing. The input control unit has a function to control the input of the redundant computing system according to a state of the diagnosis performed by the diagnosis control unit. The output control unit has a function to control the output of the redundant computing system based on a comparison result by the comparator and a diagnosis result by the diagnosis control unit.

Another aspect of the invention provides a redundant computing method wherein: an input of a first arithmetic processing unit having a first storage unit and an input of a second arithmetic processing unit with the same function as that of the first arithmetic processing unit and having a second storage unit are connected to an input control unit; an output of the first arithmetic processing unit and an output of the second arithmetic processing unit are connected to a comparator and an output control unit; a diagnosis control unit that diagnoses the first arithmetic processing unit and the second arithmetic processing unit is provided; and the first arithmetic processing unit and the second arithmetic processing unit perform the same processing in synchronization with each other.

In this redundant computing method, the diagnosis control unit diagnoses, in the course of the synchronous performance of the same processing between the first arithmetic processing unit and the second arithmetic processing unit, the second arithmetic processing unit while the first arithmetic processing unit continues the processing, and after completion of the diagnosis, copies a value in the first storage unit to the second storage unit, and then causes the first arithmetic processing unit and the second arithmetic processing unit to resume the synchronous performance of the same processing. The diagnosis control unit diagnoses, in the course of the synchronous performance of the same processing between the first arithmetic processing unit and the second arithmetic processing unit, the first arithmetic processing unit while the second arithmetic processing unit continues the processing, and after completion of the diagnosis, copies a value in the second storage unit to the first storage unit, and causes the first arithmetic processing unit and the second arithmetic processing unit to resume the synchronous performance of the same processing. The input of the redundant computing system is controlled by the input control unit according to a state of the diagnosis performed by the diagnosis control unit, and the output of the redundant computing system is controlled by the output control unit based on the comparison result by the comparator and the diagnosis result by the diagnosis control unit.

According to this invention, one of the systems in the redundant computing system is diagnosed while the other is performing arithmetic processing operation. This provides an effect that the diagnosis operation does not cause stoppage of the arithmetic processing operation. Further, the diagnosis makes it possible to detect a failure before the failure causes an error.

Thus, an advantageous effect of improving the reliability of the redundant computing system can be obtained.

EMBODIMENTS FOR CARRYING OUT THE INVENTION

Some preferred embodiments of the invention will be described in detail with reference to the drawings.

Figure 1:
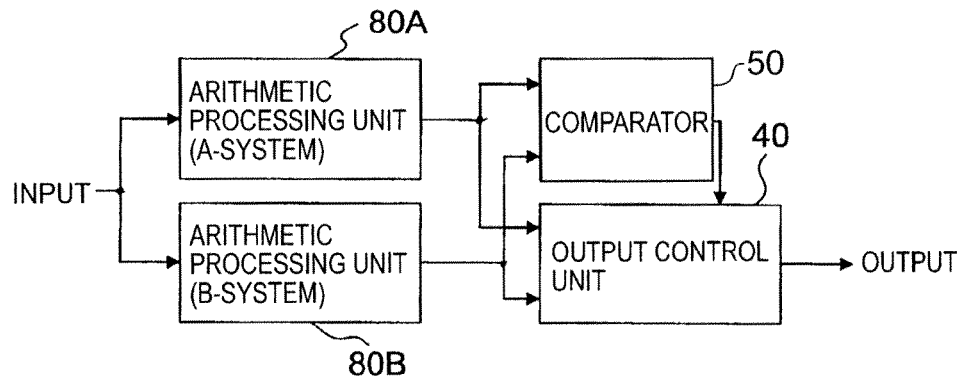
FIG. 1 is a block diagram showing a configuration example of a redundant computing system according to a related art.
Figure 2:
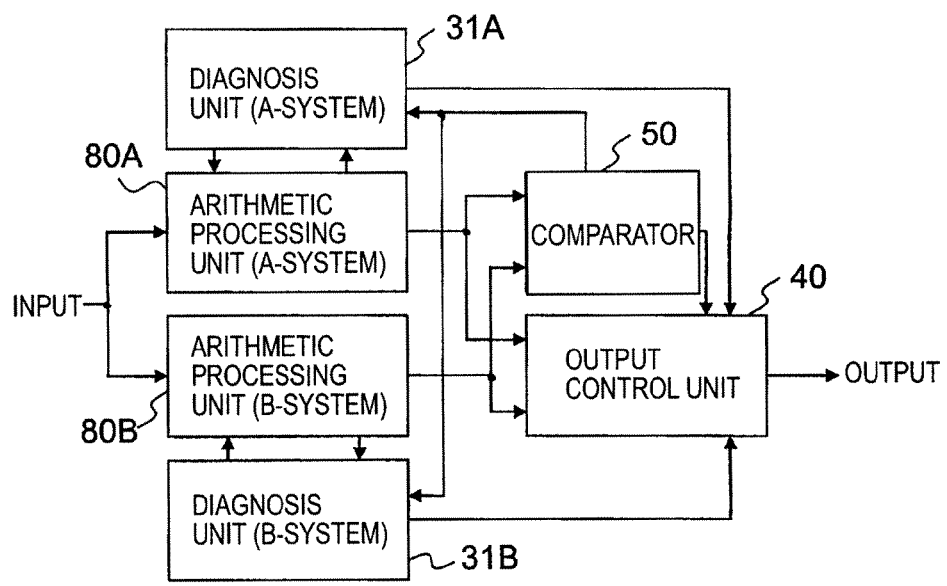
FIG. 2 is a block diagram showing a configuration of a redundant computing system described in Patent Document 1.
Figure 3:
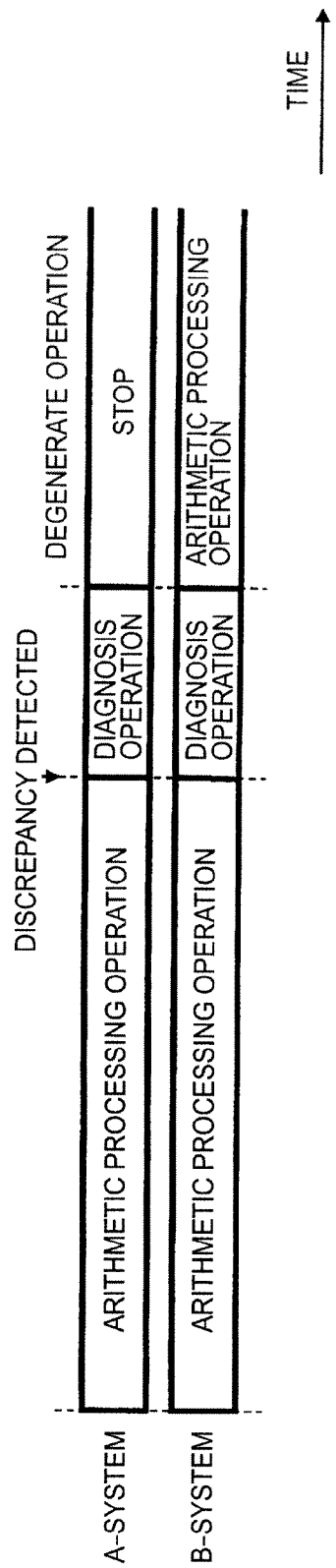
FIG. 3 is a diagram for explaining an example of operation of the redundant computing system shown in FIG. 2.
Figure 4:
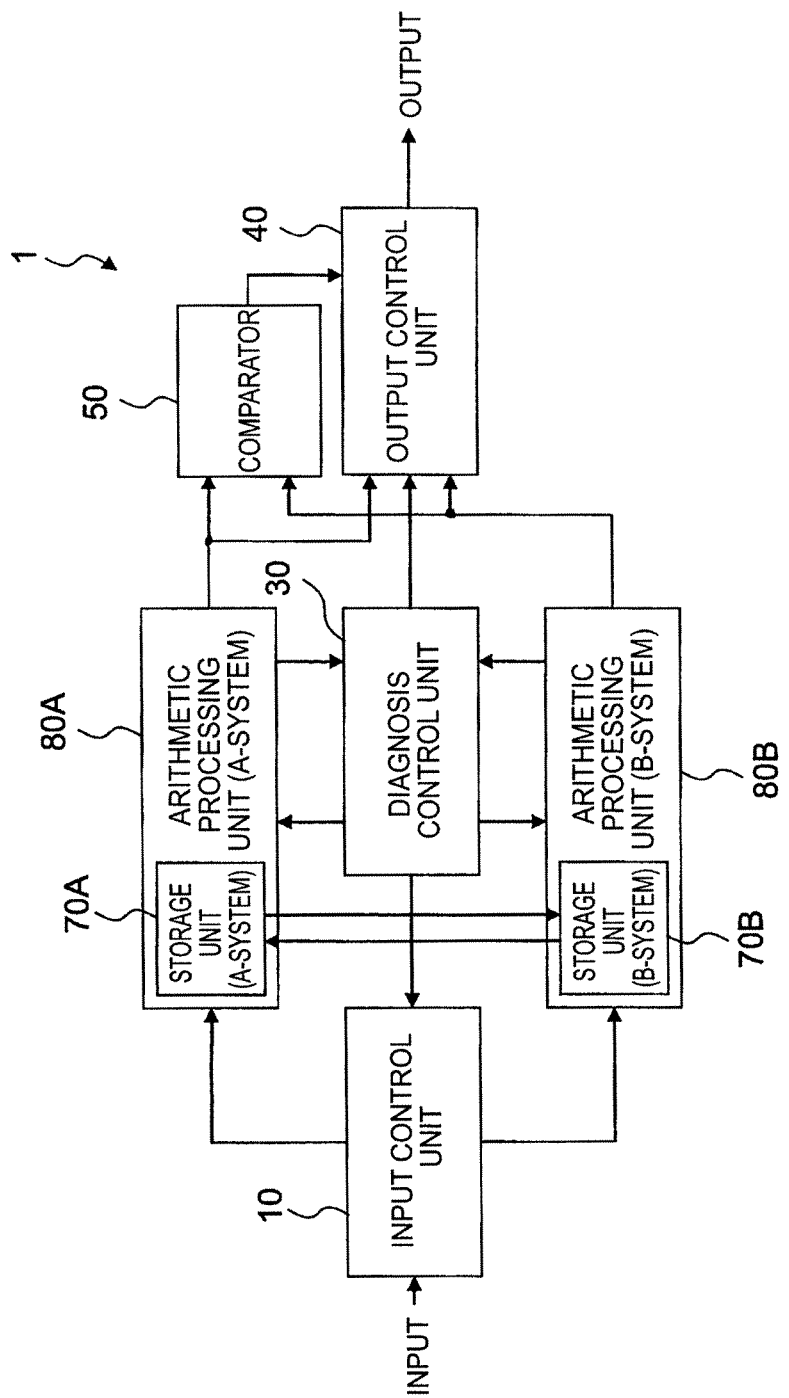
FIG. 4 is a block diagram showing a configuration of a redundant computing system according to a first embodiment of the invention.

FIG. 4 is a block diagram showing a configuration of a redundant computing system according to a first embodiment of this invention. In the drawings described blow, the same components are assigned with the same reference numbers.

Referring to FIG. 4, an input of a redundant computing system 1 is connected to inputs of an arithmetic processing unit (A-system) 80A and an arithmetic processing unit (B-system) 80B via an input control unit 10. The arithmetic processing unit (A-system) 80A and the arithmetic processing unit (B-system) 80B are able to perform the same processing in synchronization with each other. Outputs of the arithmetic processing unit (A-system) 80A and the arithmetic processing unit (B-system) 80B are connected to an output of the redundant computing system 1 via an output control unit 40. The outputs of the arithmetic processing unit (A-system) 80A and the arithmetic processing unit (B-system) 80B are also input to a comparator 50. Based on a comparison result by the comparator 50, the output control unit 40 controls the output. A diagnosis control unit 30 controls the input to and the output from the redundant computing system 1 via the input control unit 10 and the output control unit 40, respectively, while the diagnosis control unit 30 diagnoses either the arithmetic processing unit (A-system) 80A or the arithmetic processing unit (B-system) 80B to obtain a diagnosis result. The arithmetic processing unit (A-system) 80A and the arithmetic processing unit (B-system) 80B having a storage unit (A-system) 70A and a storage unit (B-system) 70B, respectively, are capable of copying information stored in the storage unit (A-system) 70A to the storage unit (B-system) 7013, or copying information stored in the storage unit (B-system) 70B to the storage unit (A-system) 70A, under the control of the diagnosis control unit 30.

Figure 5:
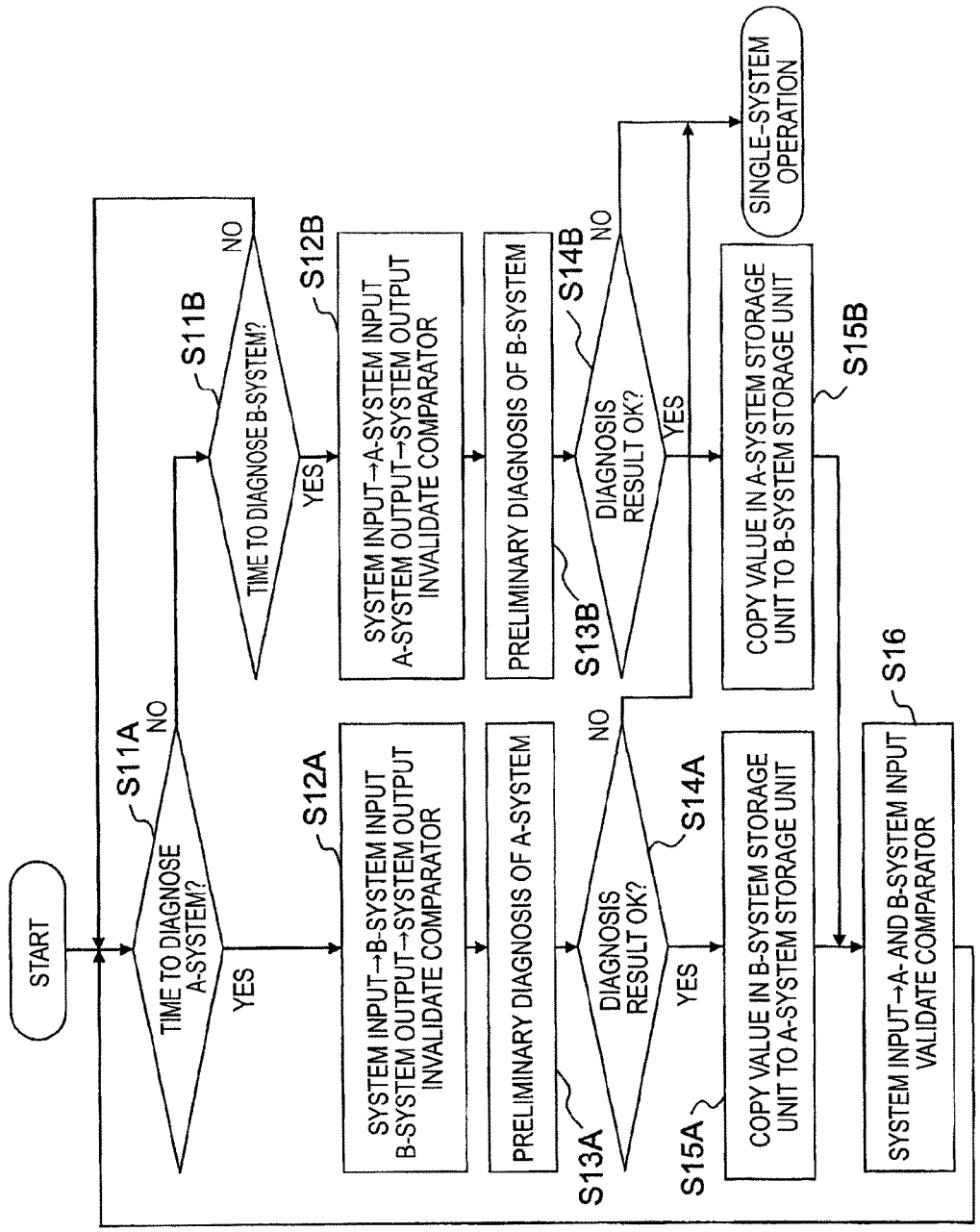
FIG. 5 is a flowchart for explaining operation of the redundant computing system shown in FIG. 4.
Figure 6:
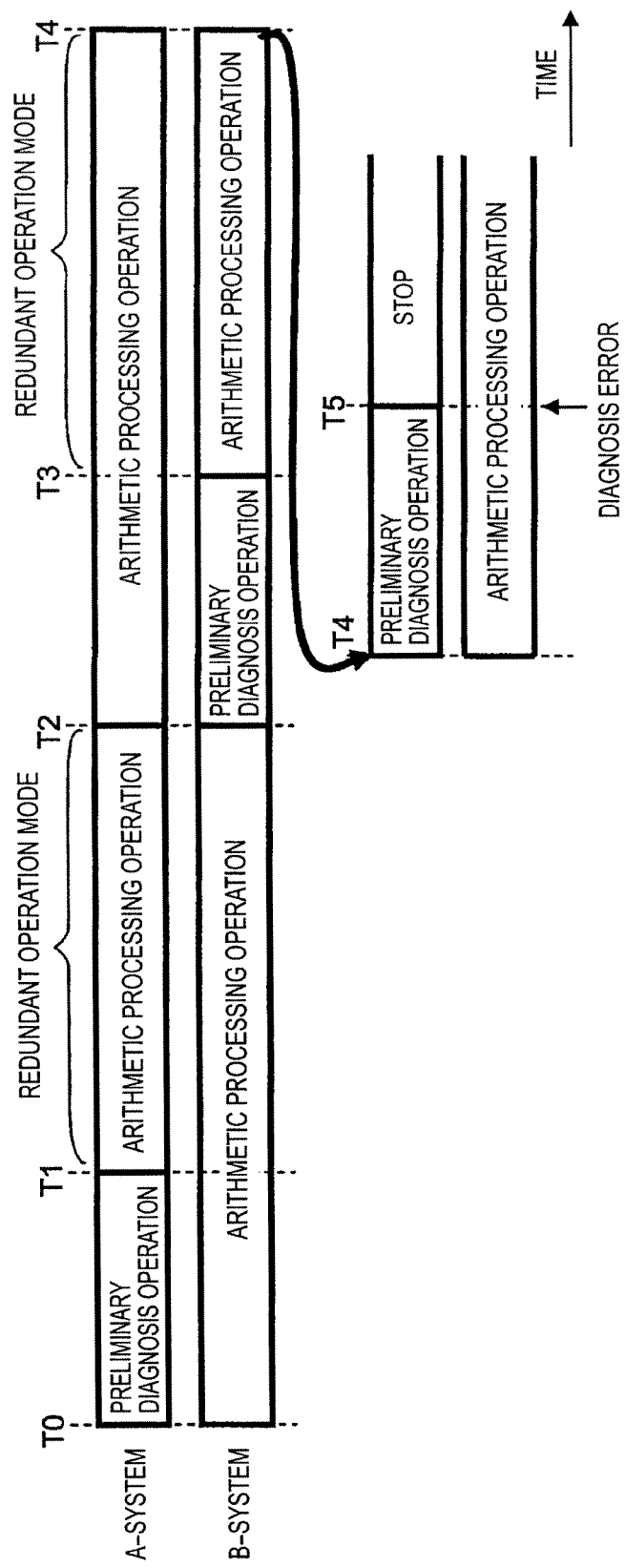
FIG. 6 is a diagram for explaining an example of operation of the redundant computing system shown in FIG. 4.

FIG. 5 is a flowchart for explaining operation of the redundant computing system 1 according to the first embodiment of this invention, and FIG. 6 is a diagram for explaining an example of operation of the redundant computing system 1 according to the first embodiment of the invention.

During normal operation of the redundant computing system 1, the input of the redundant computing system 1 is connected to the input of the arithmetic processing unit (A-system) 80A and the input of the arithmetic processing unit (B-system) 80B through the input control unit 10. An output of the arithmetic processing unit (A-system) 80A is compared with an output of the arithmetic processing unit (B-system) 80B by the comparator 50. Based on a comparison result by the comparator 50, the output control unit 40 controls the output of the redundant computing system 1.

The diagnosis control unit 30 determines whether or not it is time to diagnose the arithmetic processing unit (A-system) 80A (step S11A). When the diagnosis control unit 30 determines that it is time to diagnose the arithmetic processing unit (A-system) 80A (time T0 in FIG. 6), the diagnosis control unit 30 connects the input of the redundant computing system 1 only to the input of the arithmetic processing unit (B-system) 80B by means of the input control unit 10, while connecting the output of the arithmetic processing unit (B-system) 80B to the output of the redundant computing system 1 by means of the output control unit 40, so that the function of the comparator 50 is invalidated (step S12A).

The diagnosis control unit 30 then starts preliminary diagnosis for the arithmetic processing unit (A-system) 80A (step S13A), and determines whether the diagnosis result is affirmative or negative (step S14A). When the diagnosis result is affirmative (Y in step S14A), the diagnosis control unit 30 then copies a value of computation which is stored in the storage unit 70B of the arithmetic processing unit (B-system) 80B directly after the step of determining whether the diagnosis result is affirmative or negative (step S14A), to the storage unit 70A of the arithmetic processing unit (A-system) 80A (step S15A), and connects the input of the redundant computing system 1 to the input of the arithmetic processing unit (A-system) 80A and the input of the arithmetic processing unit (B-system) 80B by means of the input control unit 10, so that the comparator 50 is validated (step S16) and the redundant operation is resumed (time T1 in FIG. 6).

When it is determined in step S11A that it is not time to diagnose the arithmetic processing unit (A-system) 80A, the diagnosis control unit 30 then determines whether or not it is time to diagnose the arithmetic processing unit (B-system) 80B (step S11B). When it is determined that it is time to diagnose the arithmetic processing unit (B-system) 80B (time T2 in FIG. 6), the diagnosis control unit 30 connects the input of the redundant computing system 1 only to the input of the arithmetic processing unit (A-system) 80A by means of the input control unit 10, while connecting the output of the arithmetic processing unit (A-system) 80A to the output of the redundant computing system 1 by means of the output control unit 40, so that the function of the comparator 50 is invalidated (step S12B).

The diagnosis control unit 30 then starts preliminary diagnosis of the arithmetic processing unit (B-system) 80B (step S13B), and determines whether a diagnosis result is affirmative or negative (step S14B). When the diagnosis control unit 30 determines that the diagnosis result is affirmative (Y in step S14B), the diagnosis control unit 30 then copies a value of computation, which is stored in the storage unit 70A of the arithmetic processing unit (A-system) 80A directly after the step of determining whether the diagnosis result is affirmative or negative (step S14B), to the storage unit 70B of the arithmetic processing unit (B-system) 80B (step S15B), and connects the input of the redundant computing system 1 to the input of the arithmetic processing unit (A-system) 80A and the input of the arithmetic processing unit (B-system) 80B by means of the input control unit 10, so that the comparator 50 is validated (step S16) and the redundant operation is resumed (time T3 in FIG. 6).

When it is determined that it is not time to diagnose the arithmetic processing unit (A-system) 80A or the arithmetic processing unit (B-system) 80B (N in step S11B), the redundant operation is continued.

When the diagnosis result is determined (step S14A or step S14B) to be negative (N), operation of one of the arithmetic processing unit (A-system) 80A and the arithmetic processing unit (B-system) 80B is stopped, while the other one of the arithmetic processing unit (B-system) 80B and arithmetic processing unit (A-system) 80A continues to operate (time T5 in FIG. 6).

As described above, any failure existing in the arithmetic processing units of the two systems is found by performing a preliminary diagnosis before starting arithmetic processing, so that operation of the system with failure is stopped before an error is induced by the failure. This enables the redundant computing system to continue its operation without causing an error. Thus, the reliability of the redundant computing system can be improved.

It is assumed, for example, that a multiplier is included in the arithmetic processing units of the redundant computing system, but the multiplier is used less frequently. It is then assumed that a failure occurs in the multiplier of one of the systems during operation of the redundant computing system.

If the preliminary diagnosis as described above is not performed, the failure of the multiplier is not found out until the multiplier is used and the failure induces an output error, which is detected as discrepancy by the comparator. When this occurs, it is impossible to determine which of the two systems is in failure only by the comparison of arithmetic processing results of the two systems. Therefore, operation of the redundant computing system must be stopped to start diagnosis.

In contrast, when the preliminary diagnosis operation is performed as in the first embodiment of the invention, it can be checked whether or not the multiplier is in failure by the diagnosis control unit 30 performing the preliminary diagnosis even when the multiplier is not in use. If it is determined as a result of the diagnosis that there is a failure, the diagnosis control unit 30 stops operation of the system where the failure exists while allowing the other system to continue operation. Even if the multiplier is used after that, no error is output since the system without failure is operating, and hence the redundant computing system is able to continue its operation without the need of stopping the operation.

After the redundant computing system is operated with a single system, the arithmetic processing unit of the system in failure is repaired or the arithmetic processing unit of the system in failure is replaced with an arithmetic processing unit without failure, so that the redundant operation is resumed. This makes it possible to ensure the same reliability as that before the occurrence of the failure. It should be understood that the arithmetic processing unit may be repaired or replaced in entirety, or only a failure part thereof may be repaired or replaced.

Figure 7:
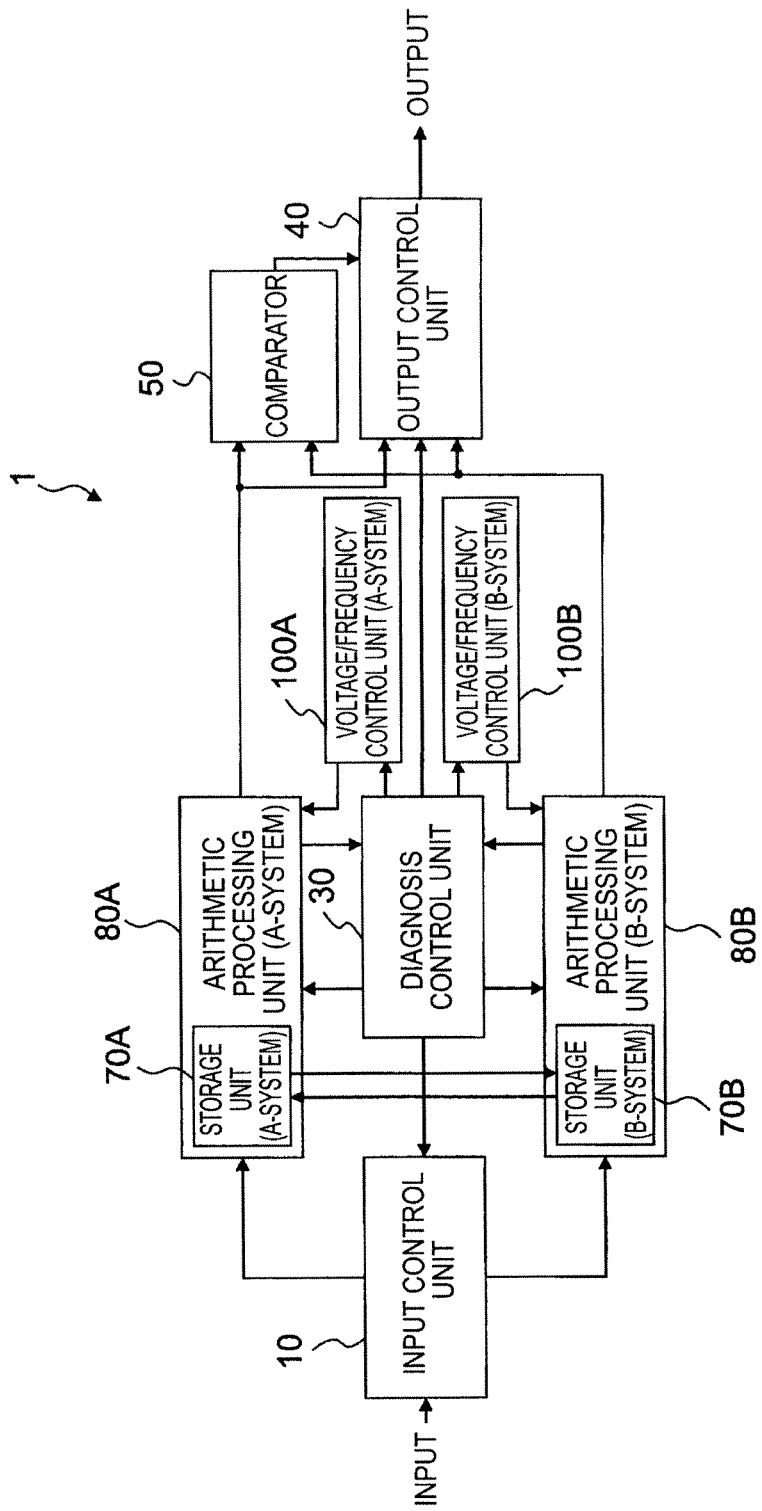
FIG. 7 is a block diagram showing a configuration of a redundant computing system according to a second embodiment of the invention.

FIG. 7 is a block diagram showing a redundant computing system according to a second embodiment of this invention. The redundant computing system according to the second embodiment is provided with, in addition to the components of the first embodiment shown in FIG. 4, a voltage/frequency control unit (A-system) 100A for changing at least one of voltage and frequency of the arithmetic processing unit (A-system) 80A, and a voltage/frequency control unit (B-system) 100B for changing at least one of voltage and frequency of the arithmetic processing unit (B-system) 80B.

In preliminary diagnosis of the arithmetic processing unit (A-system) 80A, the diagnosis of the arithmetic processing unit (A-system) 80A can be performed more efficiently, by changing at least one of voltage and frequency of the arithmetic processing unit (A-system) 80A, in other words, by changing the diagnosis condition, by means of the voltage/frequency control unit (A-system) 100A. Likewise, in preliminary diagnosis of the arithmetic processing unit (B-system) 80B, the diagnosis of the arithmetic processing unit (B-system) 80B can be performed more efficiently by changing at least one of the voltage and the frequency of the arithmetic processing unit (B-system) 80B, in other words, by changing the diagnosis condition, by means of the voltage/frequency control unit (B-system) 100B. For example, any part that is nearly breaking down but is operating normally at a normal voltage may possibly cause an error when the voltage drops. Therefore, the diagnosis is performed by expecting such a case, so that the accuracy of the preliminary diagnosis can be improved and the diagnosis can be performed more efficiently, Likewise, any part that is nearly breaking down but is operating normally at a normal frequency may possibly cause an error when the frequency is raised. Therefore, the diagnosis is performed by expecting such a case, so that the accuracy of the preliminary diagnosis can be improved and the diagnosis can be performed more efficiently.

In this manner, a failure which would not be revealed during operation at a normal voltage or frequency can be found by changing at least one of the voltage or the frequency of the arithmetic processing unit, and thus the diagnosis accuracy can be improved.

Figure 8:
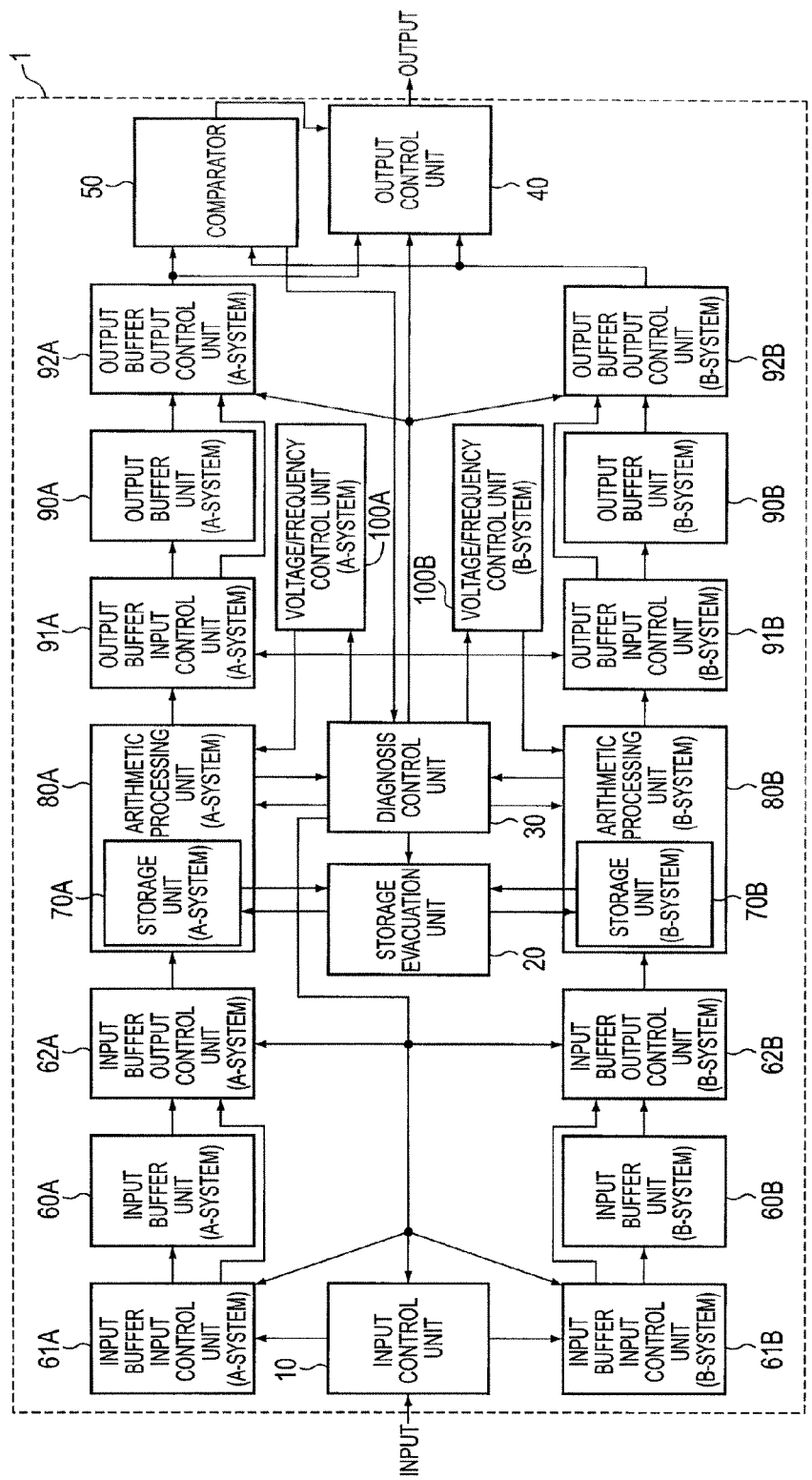
FIG. 8 is a block diagram showing a configuration of a redundant computing system according to a third embodiment of the invention.

FIG. 8 is a block diagram showing a configuration of a redundant computing system according to a third embodiment of this invention. In the redundant computing system according to the third embodiment, there are provided, in addition to the components of the second embodiment shown in FIG. 7, a path connecting between the input control unit 10 and the arithmetic processing unit (A-system) 80A by way of an input buffer input control unit (A-system) 61A, an input buffer unit (A-system) 60A and an input buffer output control unit (A-system) 62A (a path via a first input buffer unit), and a path connecting between the input control unit 10 and the arithmetic processing unit (B-system) 80B by way of an input buffer input control unit (B-system) 61B, an input buffer unit (B-system) 60B and an input buffer output control unit (B-system) 62B (a path via a second input buffer unit).

On the other hand, there are provided a path connecting the arithmetic processing unit (A-system) 80A to the output control unit 40 and comparator 50 by way of an output buffer input control unit (A-system) 91A, an output buffer unit (A-system) 90A and an output buffer output control unit (A-system) 92A (a path via a first output buffer unit), and a path connecting the arithmetic processing unit (B-system) 80B to the output control unit 40 and comparator 50 by way of an output buffer input control unit (B-system) 91B, an output buffer unit (B-system) 90B and an output buffer output control unit (B-system) 92B (a path via a second output buffer unit).

The storage unit (A-system) 70A and the storage unit (B-system) 70B are connected to a memory evacuation unit 20 connected to the diagnosis control unit 30. For example, as for the input buffer unit (A-system) 60A, the input buffer input control unit and the input buffer output control unit are provided for the purpose of establishing a path passing through or bypassing the input buffer unit (A-system) 60A under the control of the diagnosis control unit 30. Likewise, as for the output buffer unit (A-system) 90A, the output buffer input control unit and the output buffer output control unit are provided for the purpose of establishing a path passing through or bypassing the output buffer unit (A-system) 90A under the control of the diagnosis control unit 30.

Figure 9:
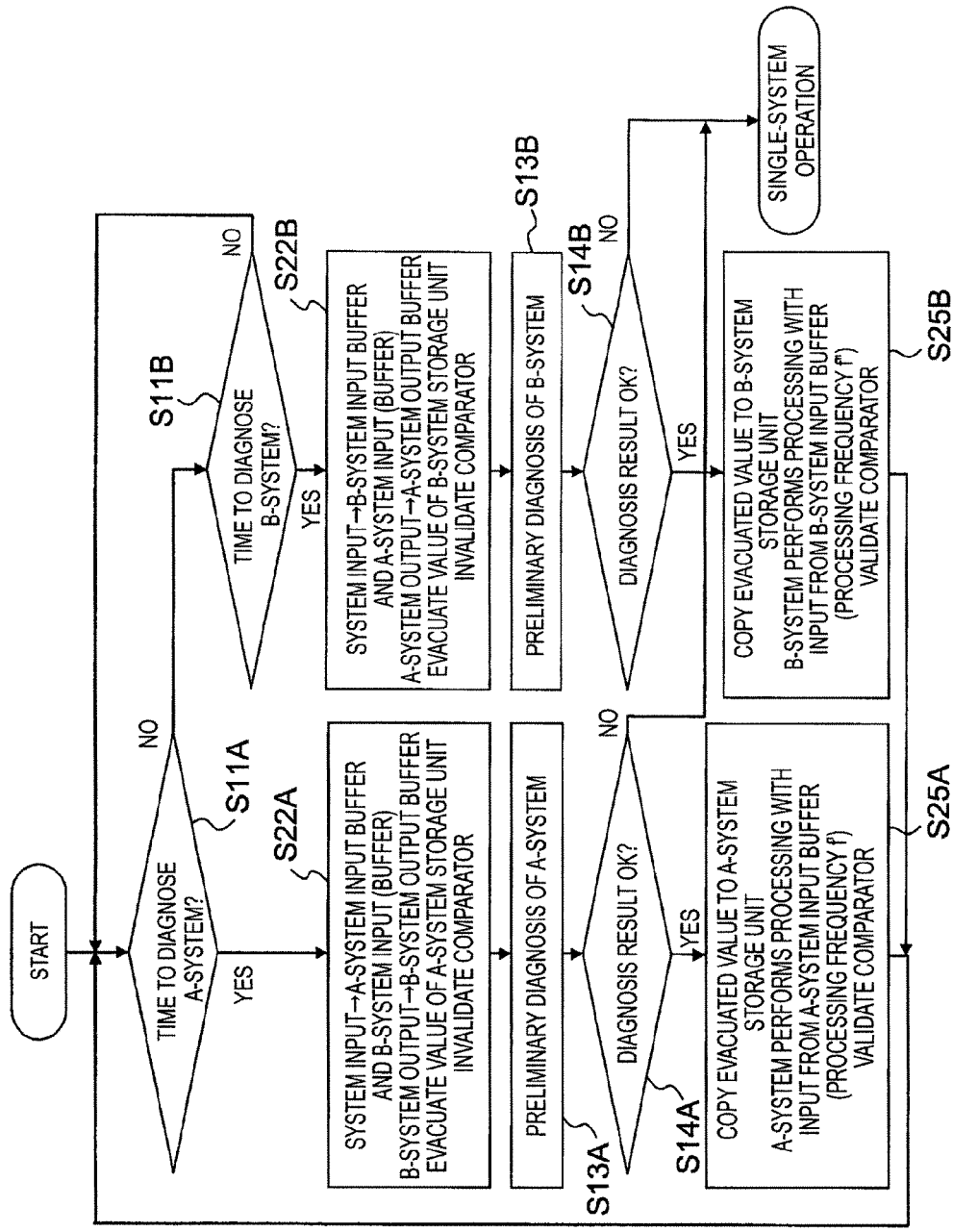
FIG. 9 is a flowchart for explaining operation of the redundant computing system according to the invention shown in FIG. 8.
Figure 10:
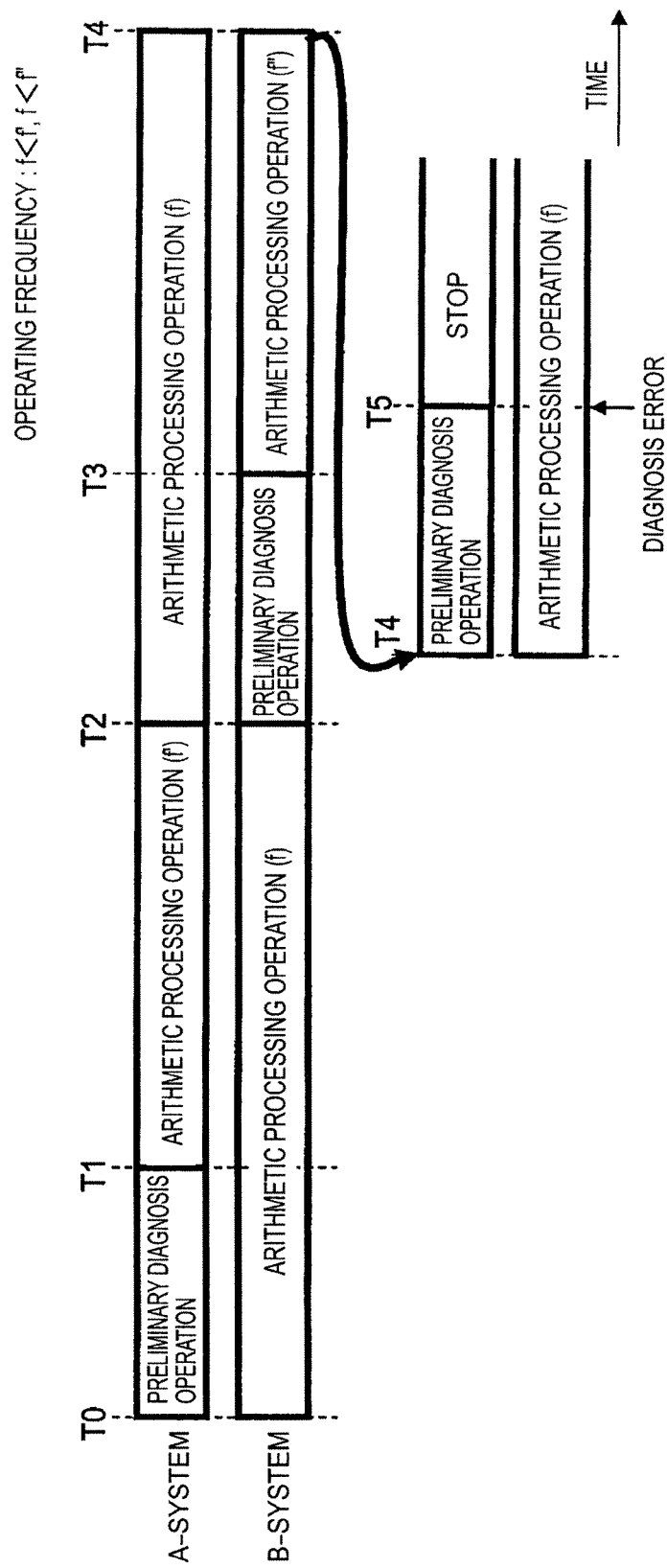
FIG. 10 is a diagram for explaining an example of operation of the redundant computing system shown in FIG. 8.

FIG. 9 is a flowchart for explaining operation of the redundant computing system 1 according to the third embodiment of the invention, and FIG. 10 is a diagram for explaining an example of the operation of the redundant computing system 1 according to the third embodiment of the invention.

The diagnosis control unit 30 determines whether or not it is time to diagnose the arithmetic processing unit (A-system) 80A (step S11A). When it is time to diagnose the arithmetic processing unit (A-system) 80A (time T0 in FIG. 10), the diagnosis control unit 30 connects the input of the redundant computing system 1 to the arithmetic processing unit (A-system) 80A via the input buffer unit (A-system) 60A by means of the input control unit 10, the input buffer input control unit (A-system) 61A, and the input buffer output control unit (A-system) 62A, whereas the diagnosis control unit 30 connects the input of the redundant computing system 1 to the arithmetic processing unit (B-system) 80B without via the input buffer unit (B-system) 60B, by means of the input control unit 10, the input buffer input control unit (B-system) 61B, and the input buffer output control unit (B-system) 62B. The diagnosis control unit 30 further connects the output of the arithmetic processing unit (B-system) 80B to the output buffer unit (B-system) 90B by means of the output buffer input control unit 91B. Further, the diagnosis control unit 30 evacuates a value stored in the storage unit (A-system) 70A to the memory evacuation unit 20, and invalidates the function of the comparator 50 (step S22A).

The arithmetic processing unit (B-system) 80B then performs processing at a frequency f, and an output obtained by the processing is stored in the output buffer unit (B-system) 90B. On the other hand, the diagnosis control unit 30 starts preliminary diagnosis of the arithmetic processing unit (A-system) 80A (step S13A), and determines whether the diagnosis result is affirmative or negative (step S14A).

When it is determined that the diagnosis result is affirmative, the diagnosis control unit 30 copies the value evacuated in the memory evacuation unit 20 to the storage unit (A-system) 70A. On the other hand, the arithmetic processing unit (A-system) 80A starts arithmetic processing at a frequency f' upon input from the input buffer unit (A-system) 60A (time T1 in FIG. 10), and the function of the comparator 50 is validated (step S25A). The comparator 50 compares the result of the arithmetic processing by the arithmetic processing unit (A-system) 80A transmitted without via the output buffer unit (A-system) 90A with the value in the output buffer unit (B-system) 90B. According to a comparison result by the comparator 50, the output control unit 40 controls the output of the redundant computing system 1. It is assumed here that the frequency f' is higher than the ordinary frequency f, and is set such that the arithmetic processing to be done in time lag T2-T0 is completed in time lag T2-T1. For this purpose, an appropriate voltage and frequency are set for the arithmetic processing unit (A-system) 80A by the voltage/frequency control unit (A-system) 100A. It is particularly desirable to apply a high voltage so that the arithmetic processing unit (A-system) 80A operates stably at the frequency f' that is higher than the ordinary frequency f.

When it is determined that it is not time to diagnose the arithmetic processing unit (A-system) 80A in step S11A, the diagnosis control unit 30 then determines whether or not it is time to diagnose the arithmetic processing unit (B-system) 80B (step S11B). When it is time to diagnose the arithmetic processing unit (B-system) 80B (time T2 in FIG. 10), the diagnosis control unit 30 connects the input of the redundant computing system 1 to the arithmetic processing unit (A-system) 80A by means of the input control unit 10, the input buffer input control unit (A-system) 61A, and the input buffer output control unit (A-system) 62A without via the input buffer unit (A-system) 60A, whereas the diagnosis control unit 30 connects the input of the redundant computing system 1 to the arithmetic processing unit (B-system) 80B by means of the input control unit 10, the input buffer input control unit (B-system) 61B and the input buffer output control unit (B-system) 62B via the input buffer unit (B-system) 60B. The diagnosis control unit 30 connects the output of the arithmetic processing unit (A-system) 80A to the output buffer unit (A-system) 90A by means of the output buffer input control unit 91A. The diagnosis control unit 30 further evacuates a value stored in the storage unit (B-system) 70B to the memory evacuation unit 20, and invalidates the function of the comparator 50 (step S22B).

Subsequently, the arithmetic processing unit (A-system) 80A performs processing at the frequency f, and stores an output obtained thereby in the output buffer unit (A-system) 90A. On the other hand, the diagnosis control unit 30 starts preliminary diagnosis of the arithmetic processing unit (B-system) 80B (step S13B), and determines whether a diagnosis result is affirmative or negative (step S14B).

When the diagnosis result is affirmative, the diagnosis control unit 30 copies the value evacuated in the memory evacuation unit 20 to the storage unit (B-system) 70B. On the other hand, the arithmetic processing unit (B-system) 80B starts arithmetic processing at a frequency f" upon input from the input buffer unit (B-system) 60B (T3 in FIG. 10), and the function of the comparator 50 is validated (step S25B). The comparator 50 compares the result of arithmetic processing by the arithmetic processing unit (B-system) SOB transmitted without via the output buffer unit (B-system) 90B with the value in the output buffer unit (A-system) 90A. According to a comparison result by the comparator 50, the output control unit 40 controls the output of the redundant computing system 1. It is assumed here that the frequency f" is higher than the ordinary frequency f and is set such that the arithmetic processing to be done in time lag T4-T2 is completed in time lag T4-T3. For this purpose, an appropriate voltage and frequency are set for the arithmetic processing unit (B-system) SOB by the voltage/frequency control unit (B-system) 100B. It is particularly desirable to apply a high voltage so that arithmetic processing unit (B-system) SOB operates stably at the frequency f" that is higher than the ordinary frequency f. The frequency f' and the frequency f' may be either the same or different.

When it is determined that the diagnosis result is negative (step S14A or step S14B), the diagnosis control unit 30 stops operation of the arithmetic processing unit (A-system) 80A or the arithmetic processing unit (B-system) 80B, and causes the arithmetic processing unit (B-system) 80B or the arithmetic processing unit (A-system) 80A to perform single-system operation (time T5 in FIG. 10).

As described above, in the system which is under the preliminary diagnosis, a value input during the preliminary diagnosis is temporarily stored in the input buffer unit, and a value in the storage unit is stored in the memory evacuation unit 20. After completion of the preliminary diagnosis operation, arithmetic processing is performed at a higher speed than ordinary arithmetic processing speed by using the stored input value and the value in the storage unit. On the other hand, in the system which is not subjected to the preliminary diagnosis, a value output from the arithmetic processing unit is temporarily stored in the output buffer unit. The comparator 50 compares the output value from the system which was subjected to the preliminary diagnosis with the output value from the system which was not subjected to the preliminary diagnosis, whereby it is made possible to compare all the arithmetic processing results without interruption and thus to improve the reliability of the redundant computing system.

Figure 11:
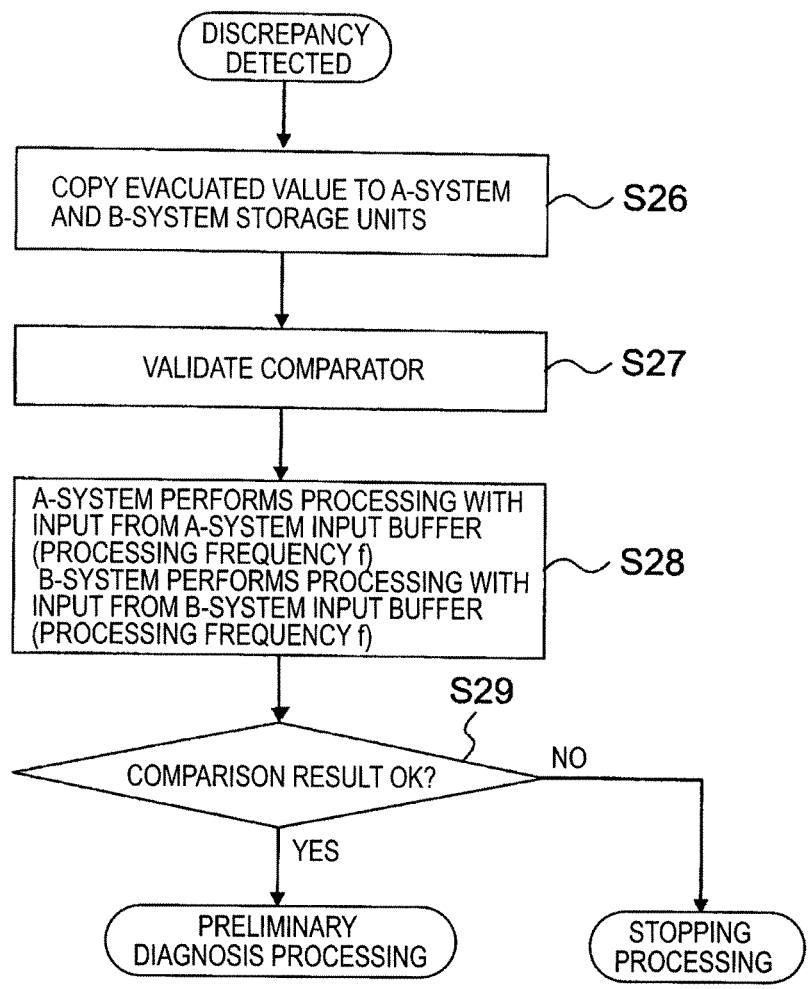
FIG. 11 is a flowchart for explaining operation when a discrepancy is detected in the redundant computing system shown in FIG. 8.
Figure 12:
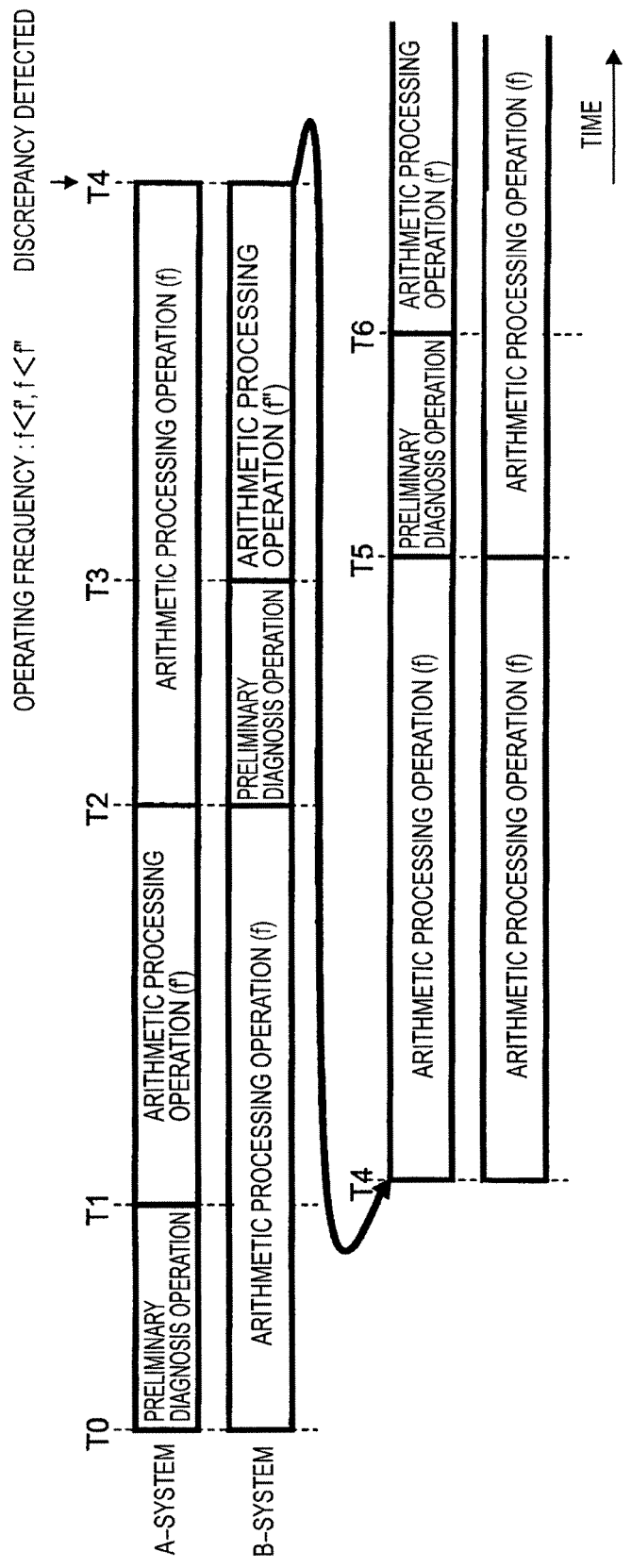
FIG. 12 is a diagram for explaining an example of the operation when a discrepancy is detected in the redundant computing system shown in FIG. 8.

FIG. 11 is a flowchart for explaining operation when the comparator 50 of the redundant computing system 1 according to the third embodiment of this invention detects a discrepancy, and FIG. 12 is a diagram showing an example of the operation when the comparator 50 of the redundant computing system 1 according to the third embodiment of this invention detects a discrepancy.

When the comparator 50 detects a discrepancy (time T4 in FIG. 12), the diagnosis control unit 30 copies the value evacuated to the memory evacuation unit 20, that is, the value of the storage unit (B-system) 70B which has been evacuated to the memory evacuation unit 20 in step S22B of FIG. 9, to the storage unit (A-system) 70A and the storage unit (B-system) 70B (step S26), so that the function of the comparator 50 is validated (step S27).

Using the value in the storage unit (A-system) 70A, the arithmetic processing unit (A-system) 80A then starts arithmetic processing at the frequency f with an input value from the input buffer unit (A-system) 60A. At the same time, the arithmetic processing unit (B-system) 80B starts arithmetic processing at the frequency f with an input value from the input buffer unit (B-system) 60B by using the value in the storage unit (B-system) 70B (step S28).

The diagnosis control unit 30 determines whether or not the comparison result by the comparator 50 shows a discrepancy (step S29). When the comparison result does not show a discrepancy, the diagnosis control unit 30 resumes the preliminary diagnosis processing (time T5 in FIG. 12). When it shows a discrepancy, the diagnosis control unit 30 performs stopping processing.

When the cause of an output error is a temporary malfunction such as a soft error occurring in a period from time T2 to time T4, the error can be rapidly recovered from by the diagnosis control unit 30 causing the arithmetic processing to be reexecuted while returning the processing flow back to time T2 from time T4 when the discrepancy is detected. It can be determined whether the malfunction is temporary or not, for example, in a manner as follows. When a discrepancy is detected at time T4 but no discrepancy is detected until time T5 after the reexecution of the processing, then it can be determined that the discrepancy detected at time T4 is a temporary malfunction occurring in either system. In the operation described above, it is desirable that the input of the redundant computing system 1 is connected to the arithmetic processing unit (A-system) 80A via the input buffer unit (A-system) 60A and to the arithmetic processing unit (B-system) 80B via the input buffer unit (B-system) 60B before the preliminary diagnosis.

When the comparator 50 detects a discrepancy, the output control unit may hold an existing value. This operation is able to realize a fail-safe function of preventing an incorrect value.

Figure 13:
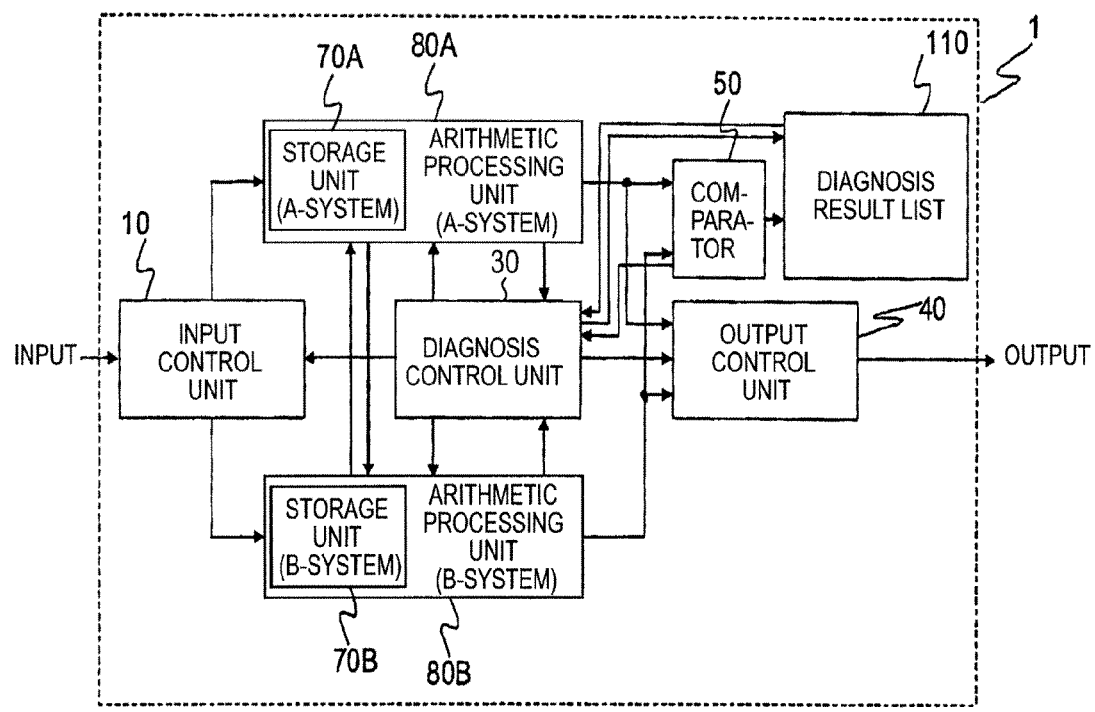
FIG. 13 is a block diagram showing a configuration of a redundant computing system according to a fourth embodiment of the invention.

FIG. 13 is a block diagram showing a configuration of a redundant computing system 1 according to a fourth embodiment of this invention. The redundant computing system according to the fourth embodiment has a diagnosis result list 110 in addition to those components of the first embodiment shown in FIG. 4.

In the diagnosis result list 110, there are sequentially stored preliminary diagnosis results by the diagnosis control unit 30 (a system with failure and failure location). When a comparison result by the comparator 50 shows a discrepancy, the diagnosis control unit 30 estimates which system is in failure based on the content of the discrepancy by referring to the diagnosis result list 110, and instructs the output control unit 40 to stop the output from the system in failure.

Figure 14:
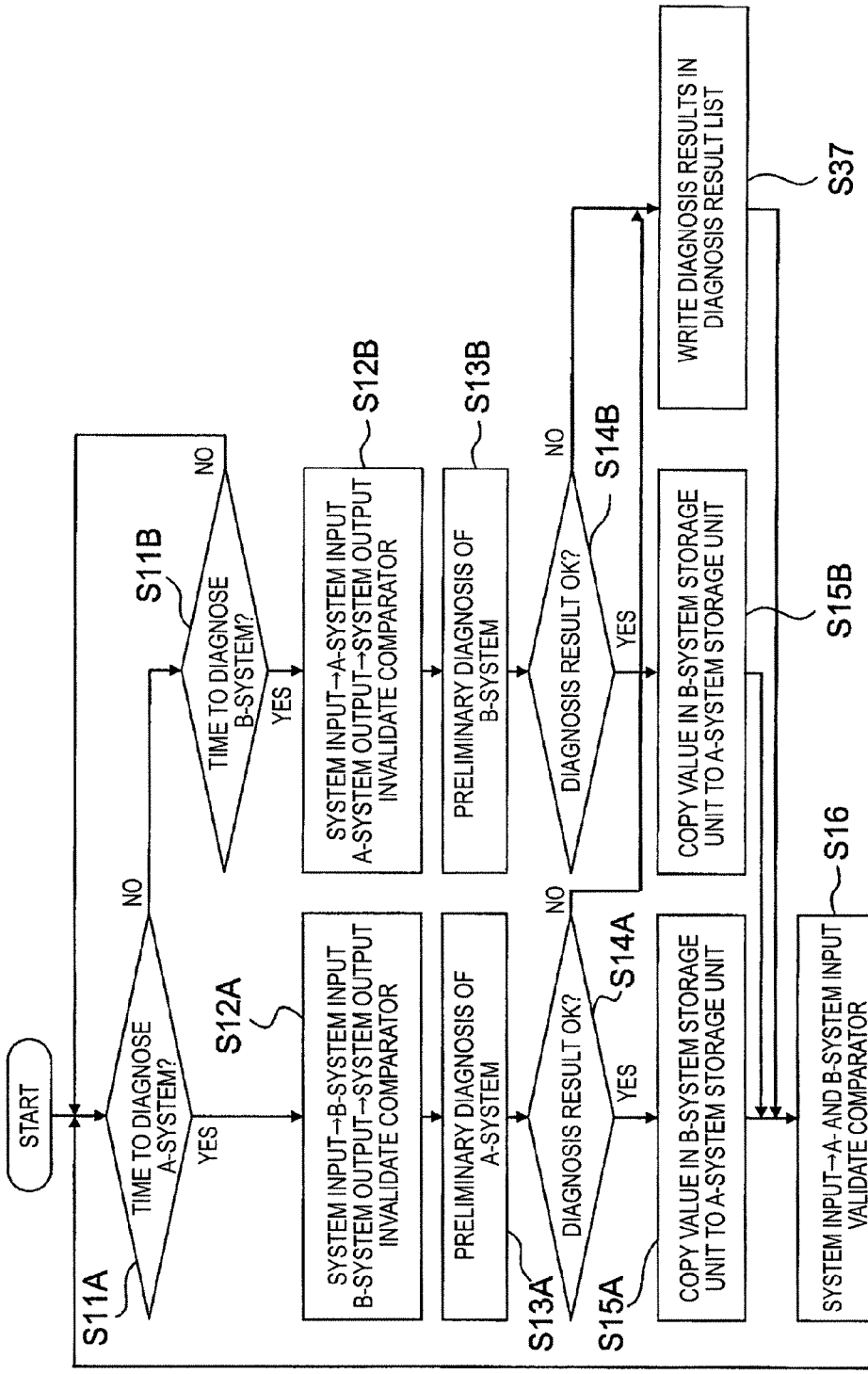
FIG. 14 is a flowchart for explaining operation of the redundant computing system shown in FIG. 13.
Figure 15:
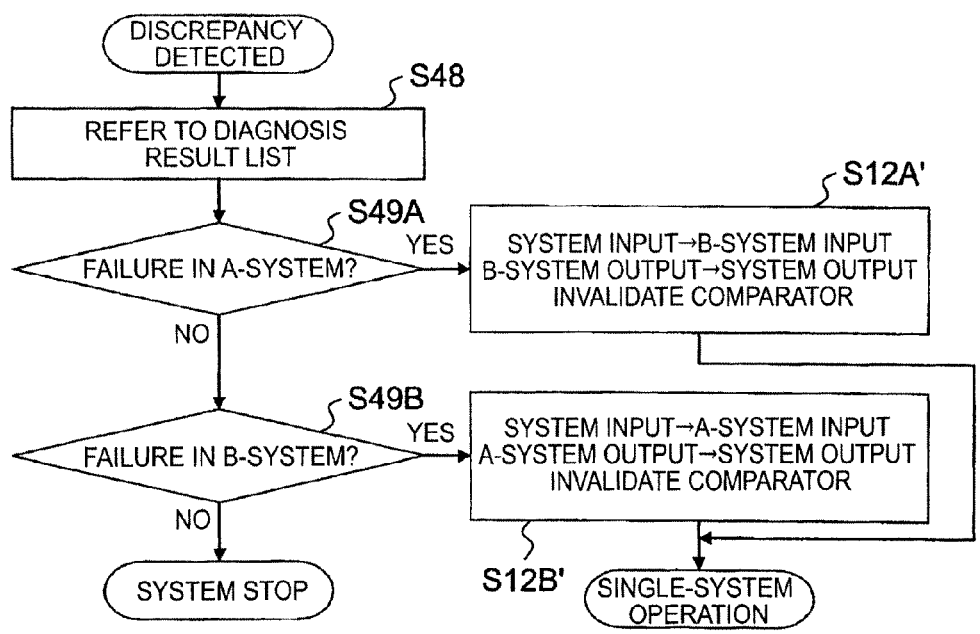
FIG. 15 is a flowchart for explaining operation when a discrepancy is detected in the redundant computing system shown in FIG. 13.
Figure 16:
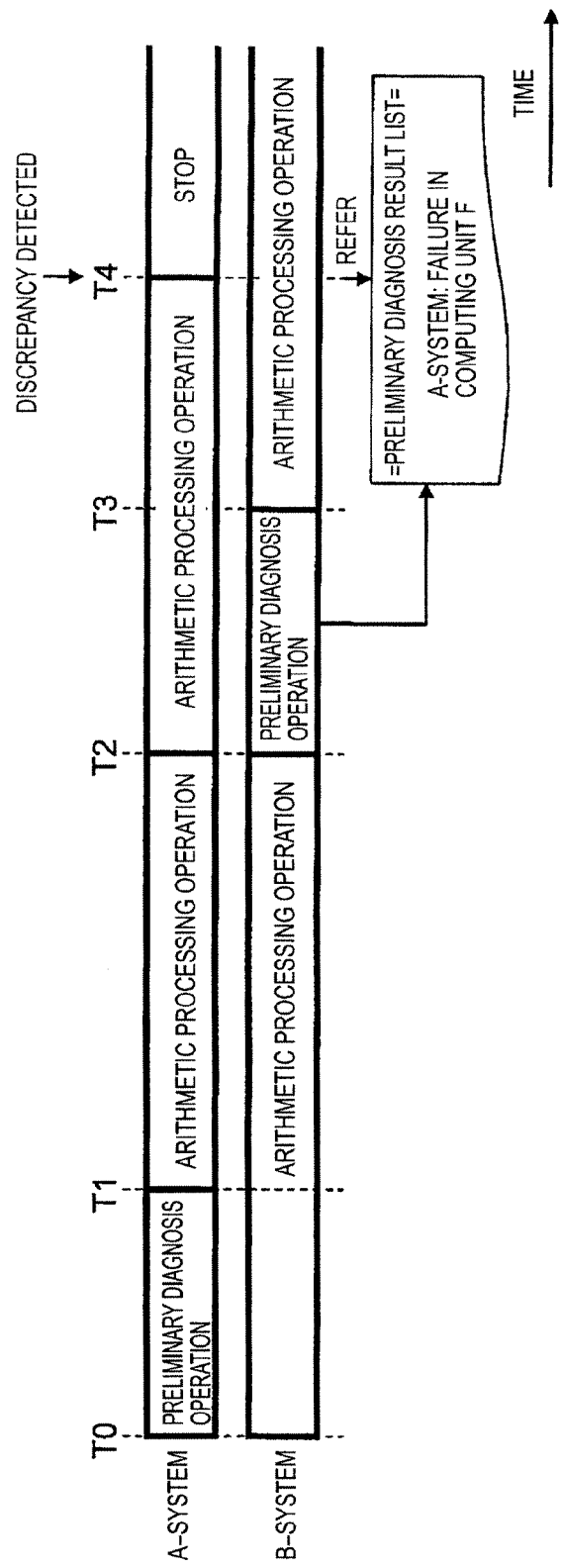
FIG. 16 is a diagram for explaining an example of operation of the redundant computing system shown in FIG. 13.

FIG. 14 is a flowchart for explaining operation of the redundant computing system 1 according to the fourth embodiment of the invention, and FIG. 15 is a flowchart for explaining the operation when the comparator 50 of the redundant computing system 1 according to the fourth embodiment of the invention detects a discrepancy. FIG. 16 is a diagram showing an example of operation of the redundant computing system 1 according to the fourth embodiment of the invention.

Referring to FIG. 14, it is different from the flowchart shown in FIG. 5 for explaining operation of the redundant computing system 1 according to the first embodiment of the invention, in the flow after the diagnosis result is determined to be negative (step S14A or S14B). In this case, the diagnosis control unit 30 writes the diagnosis result in the diagnosis result list 110 (step S37), and connects the input of the redundant computing system 1 to the input of the arithmetic processing unit (A-system) 80A and the input of the arithmetic processing unit (B-system) 80B by means of the input control unit 10 to validate the comparator 50 (step S16), whereby redundant system operation is resumed (time T3 in FIG. 16).

Referring to FIG. 15, when the comparator 50 detects a discrepancy (time T4 in FIG. 16), the diagnosis control unit 30 refers to the diagnosis result list 110 (step S48), and determines based on the content of the discrepancy whether or not the failure is of the arithmetic processing unit (A-system) 80A (step S49A).

When the diagnosis control unit 30 determines that the failure is of the arithmetic processing unit (A-system) 80A, the diagnosis control unit 30 connects the input of the redundant computing system 1 only to the input of the arithmetic processing unit (B-system) 80B by means of the input control unit 10. Further, the diagnosis control unit 30 connects the output of the arithmetic processing unit (B-system) 80B to the output of the redundant computing system 1 by means of the output control unit 40, so that the function of the comparator 50 is invalidated (step S12A').

When the diagnosis control unit 30 does not determine that the failure is of the arithmetic processing unit (A-system) 80A, then the diagnosis control unit 30 determines whether or not the failure is of the arithmetic processing unit (B-system) 80B (step S49B).

When the diagnosis control unit 30 determines that the failure is of the arithmetic processing unit (B-system) 80B, the diagnosis control unit 30 connects the input of the redundant computing system 1 only to the input of the arithmetic processing unit (A-system) 80A by means of the input control unit 10. The diagnosis control unit 30 also connects the output of the arithmetic processing unit (A-system) 80A to the output of the redundant computing system 1 by means of the output control unit 40, so that the function of the comparator 50 is invalidated (step S12B').

When the diagnosis control unit 30 does not determine in step S49B that the failure is of the arithmetic processing unit (B-system) 80B, the diagnosis control unit 30 stops operation of the redundant computing system 1 as it is impossible to determine which of the systems is in failure.

As described above, when a failure is found by the preliminary failure diagnosis, the diagnosis control unit only records the diagnosis result without immediately stopping the system in failure. The diagnosis control unit stops the system in failure to transit to single-system operation only when a discrepancy in output is detected, whereby it is made possible to continue the redundant operation as long as possible and to improve the reliability of the redundant computing system.

Although the invention has been described based on some preferred embodiments thereof, the invention is not limited to these embodiments. It should be understood that various modifications and variations will be apparent to those skilled in the art without departing from the spirit of the invention, and all these modification and variations also fall within the spirit and scope of the invention.

This application is based upon and claims the benefit of priority from Japanese Patent Application No. 2009-274077 filed Dec. 2, 2009, the disclose of which is incorporated herein in its entirety by reference.

The invention claimed is:

1. A redundant computing system wherein:
an input of a first arithmetic processing unit having a first storage unit and an input of a second arithmetic processing unit with the same function as that of the first arithmetic processing unit and having a second storage unit are connected to an input control unit;
an output of the first arithmetic processing unit and an output of the second arithmetic processing unit are connected to a comparator and an output control unit;
the redundant computing system includes a diagnosis control unit that diagnoses the first arithmetic processing unit and the second arithmetic processing unit; and
the first arithmetic processing unit and the second arithmetic processing unit perform the same processing in synchronization with each other, and wherein:
the diagnosis control unit has a function to control such that, in the course of the synchronous performance of the same processing between the first arithmetic processing unit and the second arithmetic processing unit, the second arithmetic processing unit is diagnosed while the first arithmetic processing unit continues the processing, and after completion of the diagnosis, a value in the first storage unit is copied to the second storage unit, and then the first arithmetic processing unit and the second arithmetic processing unit are caused to resume the synchronous performance of the same processing;
the diagnosis control unit has a function to control such that, in the course of the synchronous performance of the same processing between the first arithmetic processing unit and the second arithmetic processing unit, the first arithmetic processing unit is diagnosed while the second arithmetic processing unit continues the processing, and after completion of the diagnosis, a value in the second storage unit is copied to the first storage unit, and then the first arithmetic processing unit and the second arithmetic processing unit are caused to resume the synchronous performance of the same processing;
the input control unit has a function to control the input of the redundant computing system according to a state of the diagnosis performed by the diagnosis control unit; and
the output control unit has a function to control the output of the redundant computing system based on a comparison result by the comparator and a diagnosis result by the diagnosis control unit,
the redundant computing system further comprising:
a first voltage/frequency control unit for controlling at least one of voltage and frequency of the first arithmetic processing unit; and
a second voltage/frequency control unit for controlling at least one of voltage and frequency of the second arithmetic processing unit.

2. The redundant computing system according to claim 1, wherein:
a path is provided to connect the input control unit to the input of the first arithmetic processing unit via a first input buffer unit;
a path is provided to connect the input control unit to the input of the second arithmetic processing unit via a second input buffer unit;

a path is provided to connect the output of the first arithmetic processing unit to the comparator and the output control unit via a first output buffer unit;

a path is provided to connect the output of the second arithmetic processing unit to the comparator and the output control unit via a second output buffer unit;

a memory evacuation unit that holds a value in the first storage unit or the second storage unit;

the diagnosis control unit has functions such that:

a value in the first storage unit is evacuated to the memory evacuation unit before starting diagnosis of the first arithmetic processing unit;

after starting the diagnosis of the first arithmetic processing unit, an input value to the redundant computing system is stored in the first input buffer unit, while an output value from the second arithmetic processing unit is stored in the second output buffer unit;

after completion of the diagnosis of the first arithmetic processing unit, the value evacuated to the memory evacuation unit is returned to the first storage unit, and the first arithmetic processing unit is caused to resume arithmetic processing;

before starting diagnosis of the second arithmetic processing unit, a value in the second storage unit is evacuated to the memory evacuation unit;

after starting the diagnosis of the second arithmetic processing unit, an input value to the redundant computing system is stored in the second input buffer unit, while an output value from the first arithmetic processing unit is stored in the first output buffer unit; and after completion of the diagnosis of the second arithmetic processing unit, the value evacuated to the memory evacuation unit is returned to the second storage unit, and the second arithmetic processing unit is caused to resume arithmetic processing.

3. The redundant computing system according to claim 2, wherein:

the diagnosis control unit has a function such that after starting diagnosis of the first arithmetic processing unit, an input value to the redundant computing system is stored in the second input buffer unit, and after starting diagnosis of the second arithmetic processing unit, an input value to the redundant computing system is stored in the first input buffer unit;

the diagnosis control unit further has a function such that when a comparison result by the comparator shows a discrepancy, the value in the memory evacuation unit is returned to the first storage unit and the second storage unit; and the redundant computing system performs recomputation using the input values stored in the first input buffer unit and the second input buffer unit.

4. The redundant computing system according to claim 2, wherein when a comparison result of the comparator shows a discrepancy, the output control unit holds an existing output value.

5. The redundant computing system according to claim 2, wherein:

when a failure is found as a result of the diagnosis performed by the diagnosis control unit, the diagnosis control unit stops operation of one of the first arithmetic processing unit and the second arithmetic processing unit that the failure has found; and the output control unit uses the output of another one of the first arithmetic processing unit and the second arithmetic processing unit as the output of the redundant computing system.

6. The redundant computing system according to claim 2, wherein:

the redundant computing system further comprises a diagnosis result list for storing results of diagnosis performed by the diagnosis control unit;

when a comparison result by the comparator shows a discrepancy, the diagnosis control unit refers to the diagnosis result list to determine which of the first arithmetic processing unit and the second arithmetic processing unit is in failure, and stops operation of the first arithmetic processing unit or the second arithmetic processing unit, whichever is determined to be in failure; and the output control unit uses the output of the arithmetic processing unit whose operation is not stopped as the output of the redundant computing system.

7. The redundant computing system according to claim 3, wherein when a comparison result of the comparator shows a discrepancy, the output control unit holds an existing output value.

8. The redundant computing system according to claim 3, wherein:

when a failure is found as a result of the diagnosis performed by the diagnosis control unit, the diagnosis control unit stops operation of one of the first arithmetic processing unit and the second arithmetic processing unit that the failure has found; and the output control unit uses the output of another one of the first arithmetic processing unit and the second arithmetic processing unit as the output of the redundant computing system.

9. The redundant computing system according to claim 3, wherein:

the redundant computing system further comprises a diagnosis result list for storing results of diagnosis performed by the diagnosis control unit;

when a comparison result by the comparator shows a discrepancy, the diagnosis control unit refers to the diagnosis result list to determine which of the first arithmetic processing unit and the second arithmetic processing unit is in failure, and stops operation of the first arithmetic processing unit or the second arithmetic processing unit, whichever is determined to be in failure; and the output control unit uses the output of the arithmetic processing unit whose operation is not stopped as the output of the redundant computing system.

10. The redundant computing system according to 1, wherein when a comparison result of the comparator shows a discrepancy, the output control unit holds an existing output value.

11. The redundant computing system according to claim 10, wherein:

when a failure is found as a result of the diagnosis performed by the diagnosis control unit, the diagnosis control unit stops operation of one of the first arithmetic processing unit and the second arithmetic processing unit that the failure has found; and the output control unit uses the output of another one of the first arithmetic processing unit and the second arithmetic processing unit as the output of the redundant computing system.

12. The redundant computing system according to claim 10, wherein:

the redundant computing system further comprises a diagnosis result list for storing results of diagnosis performed by the diagnosis control unit;

when a comparison result by the comparator shows a discrepancy, the diagnosis control unit refers to the diagnosis result list to determine which of the first arithmetic processing unit and the second arithmetic processing unit is in failure, and stops operation of the first arithmetic processing unit or the second arithmetic processing unit, whichever is determined to be in failure; and the output control unit uses the output of the arithmetic processing unit whose operation is not stopped as the output of the redundant computing system.

13. The redundant computing system according to claim 1, wherein:

when a failure is found as a result of the diagnosis performed by the diagnosis control unit, the diagnosis control unit stops operation of one of the first arithmetic processing unit and the second arithmetic processing unit that the failure has found; and the output control unit uses the output of another one of the first arithmetic processing unit and the second arithmetic processing unit as the output of the redundant computing system.

14. The redundant computing system according to claim 1, wherein:

the redundant computing system further comprises a diagnosis result list for storing results of diagnosis performed by the diagnosis control unit;

when a comparison result by the comparator shows a discrepancy, the diagnosis control unit refers to the diagnosis result list to determine which of the first arithmetic processing unit and the second arithmetic processing unit is in failure, and stops operation of the first arithmetic processing unit or the second arithmetic processing unit, whichever is determined to be in failure; and the output control unit uses the output of the arithmetic processing unit whose operation is not stopped as the output of the redundant computing system.

15. The redundant computing system according to claim 14, wherein the first arithmetic processing unit or the second arithmetic processing unit, whichever is stopped due to the failure is repaired or replaced so that the redundant operation is resumed.

16. The redundant computing system according to claim 1, wherein:

when a failure is found as a result of the diagnosis performed by the diagnosis control unit, the diagnosis control unit stops operation of one of the first arithmetic processing unit and the second arithmetic processing unit that the failure has found; and the output control unit uses the output of another one of the first arithmetic processing unit and the second arithmetic processing unit as the output of the redundant computing system.

17. The redundant computing system according to claim 1, wherein:

the redundant computing system further comprises a diagnosis result list for storing results of diagnosis performed by the diagnosis control unit;

when a comparison result by the comparator shows a discrepancy, the diagnosis control unit refers to the diagnosis result list to determine which of the first arithmetic processing unit and the second arithmetic processing unit is in failure, and stops operation of the first arithmetic processing unit or the second arithmetic processing unit, whichever is determined to be in failure; and the output control unit uses the output of the arithmetic processing unit whose operation is not stopped as the output of the redundant computing system.

18. A redundant computing method wherein: an input of a first arithmetic processing unit having a first storage unit and an input of a second arithmetic processing unit with the same function as that of the first arithmetic processing unit and having a second storage unit are connected to an input control unit; an output of the first arithmetic processing unit and an output of the second arithmetic processing unit are connected to a comparator and an output control unit; a diagnosis control unit that diagnoses the first arithmetic processing unit and the second arithmetic processing unit is provided; and the first arithmetic processing unit and the second arithmetic processing unit perform the same processing in synchronization with each other, and wherein:

the diagnosis control unit diagnoses, in the course of the synchronous performance of the same processing between the first arithmetic processing unit and the second arithmetic processing unit, the second arithmetic processing unit while the first arithmetic processing unit continues the processing, and after completion of the diagnosis, copies a value in the first storage unit to the second storage unit, and then causes the first arithmetic processing unit and the second arithmetic processing unit to resume the synchronous performance of the same processing;

the diagnosis control unit diagnoses, in the course of the synchronous performance of the same processing between the first arithmetic processing unit and the second arithmetic processing unit, the first arithmetic processing unit while the second arithmetic processing unit continues the processing, and after completion of the diagnosis, copies a value in the second storage unit to the first storage unit, and causes the first arithmetic processing unit and the second arithmetic processing unit to resume the synchronous performance of the same processing; and the input of the redundant computing system is controlled by the input control unit according to a state of the diagnosis performed by the diagnosis control unit, and the output of the redundant computing system is controlled by the output control unit based on the comparison result by the comparator and the diagnosis result by the diagnosis control unit, wherein when a comparison result of the comparator shows a discrepancy, the output control unit holds an existing output value.

\* \* \* \* \*